United States Patent
Rawsthorne et al.

(10) Patent No.: US 7,353,163 B2
(45) Date of Patent: Apr. 1, 2008

(54) EXCEPTION HANDLING METHOD AND APPARATUS FOR USE IN PROGRAM CODE CONVERSION

(75) Inventors: Alasdair Rawsthorne, Manchester (GB); John H. Sandham, Manchester (GB); Jason Souloglou, Manchester (GB)

(73) Assignee: Transitive Limited, Manchester (GB)

(*) Notice: Subject to any disclaimer, the term of this patent is extended or adjusted under 35 U.S.C. 154(b) by 1249 days.

(21) Appl. No.: 09/827,970

(22) Filed: Apr. 6, 2001

(65) Prior Publication Data

US 2003/0191622 A1    Oct. 9, 2003

Related U.S. Application Data

(63) Continuation of application No. PCT/GB00/01439, filed on Apr. 26, 2000.

(60) Provisional application No. 60/135,106, filed on Apr. 27, 1999.

(30) Foreign Application Priority Data

Apr. 27, 1999    (GB) ................... 9909615.8

(51) Int. Cl.
*G06F 9/455* (2006.01)
*G06F 13/14* (2006.01)

(52) U.S. Cl. ............. 703/28; 717/138; 717/146

(58) Field of Classification Search .......... 703/26, 703/27, 28; 711/207; 712/227, 217, 32, 712/242; 714/53, 723; 717/138, 137, 146
See application file for complete search history.

(56) References Cited

U.S. PATENT DOCUMENTS

| | | | | | |
|---|---|---|---|---|---|
| 4,589,087 | A | * | 5/1986 | Auslander et al. | 708/670 |
| 5,280,592 | A | * | 1/1994 | Ryba et al. | 710/200 |
| 5,560,013 | A | * | 9/1996 | Scalzi et al. | 717/138 |
| 5,682,492 | A | * | 10/1997 | McFarland et al. | 712/214 |
| 5,794,029 | A | * | 8/1998 | Babaian et al. | 712/241 |
| 5,832,205 | A | | 11/1998 | Kelly et al. | |

(Continued)

FOREIGN PATENT DOCUMENTS

| | | |
|---|---|---|
| EP | 0285310 | 10/1988 |
| WO | 98/59292 | 12/1998 |

*Primary Examiner*—Thai Phan
(74) *Attorney, Agent, or Firm*—Wilmer Cutler Pickering Hale and Dorr LLP

(57) ABSTRACT

A method of handling exceptions for use in an emulator (20) performing program code conversion. Registers (X) of a subject machine (11) being emulated (20) are represented by a pair of abstract registers ($X_A, X_B$) on the target machine (31), suitably using memory locations of the target machine and/or any available target registers. One of the pair (e.g., Reg $X_A$) holds a definitive value at entry into a section (100) of subject code (10) while the other (e.g., Reg $X_B$) holds a speculative value which is updated during translation and execution of that section of code. Exceptions are handled by recovering the conditions of the virtual subject machine (11) upon entry into the section of subject code (100) using the definitive version of each abstract register (i.e., Reg $X_A$). Advantageously, the function of the pair of registers ($X_A, X_B$) is alternated upon successful completion of each section of subject code (100) such that a definitive version of each register is always available for exception handling while avoiding time consuming copy and storing operations.

15 Claims, 3 Drawing Sheets

Register Memory Map

| Register | Target Set A Values | | Target Set B Values | |
|---|---|---|---|---|
| Reg X | Reg $X_A$ | Definitive | Reg $X_B$ | Speculative |
| Reg Y | Reg $Y_A$ | Speculative | Reg $Y_B$ | Definitive |
| ... | | | | |

U.S. PATENT DOCUMENTS

| | | | |
|---|---|---|---|
| 5,835,748 A * | 11/1998 | Orenstein et al. | 712/217 |
| 5,872,950 A | 2/1999 | Levitan et al. | |
| 5,933,642 A * | 8/1999 | Greenbaum et al. | 717/140 |
| 5,974,440 A * | 10/1999 | Brooks et al. | 710/262 |
| 6,075,942 A * | 6/2000 | Cartwright, Jr. | 717/138 |
| 6,199,152 B1 * | 3/2001 | Kelly et al. | 711/207 |
| 6,260,190 B1 * | 7/2001 | Ju | 717/156 |
| 6,631,514 B1 * | 10/2003 | Le | 717/137 |
| 6,633,970 B1 * | 10/2003 | Clift et al. | 712/217 |
| 6,681,238 B1 * | 1/2004 | Brice et al. | 718/1 |
| 6,760,888 B2 * | 7/2004 | Killian et al. | 716/1 |
| 2002/0046305 A1 * | 4/2002 | Babaian et al. | 710/5 |
| 2002/0112227 A1 * | 8/2002 | Kramskoy et al. | 717/148 |
| 2003/0126588 A1 * | 7/2003 | Souloglou et al. | 717/146 |
| 2003/0159134 A1 * | 8/2003 | Souloglou et al. | 717/148 |
| 2004/0205733 A1 * | 10/2004 | Souloglou et al. | 717/138 |
| 2004/0210880 A1 * | 10/2004 | Souloglou et al. | 717/138 |

* cited by examiner

Register Memory Map

| Register | Target Set A Values | Target Set B Values |
|---|---|---|
| Reg X | Reg $X_A$   Definitive | Reg $X_B$   Speculative |
| Reg Y | Reg $Y_A$   Definitive | Reg $Y_B$   Speculative |
| ... | ... | ... |

Fig. 5

Register Memory Map

| Register | Target Set A Values | Target Set B Values |
|---|---|---|
| Reg X | Reg $X_A$   Definitive | Reg $X_B$   Speculative |
| Reg Y | Reg $Y_A$   Speculative | Reg $Y_B$   Definitive |
| ... | | ... |

Fig. 6

EXCEPTION HANDLING METHOD AND APPARATUS FOR USE IN PROGRAM CODE CONVERSION

CROSS REFERENCE TO RELATED APPLICATIONS

This application is a continuation of PCT Application No. PCT/GB00/01439, filed Apr. 26, 2000, which is incorporated by reference in its entirety herein, and claims priority to U.S. Provisional Patent Application No. 60/135,106 filed on Apr. 27, 1999, which is incorporated by reference in its entirety herein, and claims priority to UK Patent Application No. (GB) 9909615.8, filed Apr. 27, 1999, now issued as UK Patent No. GB 2349486A, which is incorporated by reference in its entirety herein.

BACKGROUND OF THE INVENTION

1. Field of the Invention

The present invention relates in general to the field of program code conversion for computer systems and in particular, but not exclusively, to the field of emulation using dynamic binary translation.

2. Description of Related Art

A program for a computer takes several different forms. Typically a program is written first in a high-level language readily understood by a human programmer. The program is compiled from the high-level language into a low-level language more appropriate for control of a computer's processor and related components. However, in order for the processor to function, the program code must be provided in a machine-readable form that directs primitive operations of the processor such as loading, shifting, adding and storing operations. To run faster, some processors use an expanded set of instructions each of which represent a sequence of primitive instructions. This is known as a complicated instruction set computer (CISC). However, program code written (or compiled) specifically for a first processor with a particular instruction set in most cases cannot run on any other type of processor because of differences between the instruction set for each type of processor.

An emulator allows program code written for a processor of a first type (a "subject" processor) to be run on a processor of a second type (a "target" or "host" processor). One form of this emulation process is known as binary translation because executable binary code appropriate to the subject processor is translated into executable binary code appropriate to the target processor.

In static binary translation an entire program is translated prior to execution of the translated program on the target processor. This involves a significant delay. Therefore, emulators have been developed which employ dynamic binary translation to translate small sections of a source program for execution immediately on the target processor. This is much more efficient because large sections of the source code will not be used in practice, or will be used only rarely. An emulator employing a dynamic translation system selects only the required parts of the source program for translation on demand, as the program is run.

There now follows a brief summary of dynamic binary translation for an emulator as may be employed in a preferred embodiment of the present invention. More detailed background in the field of dynamic binary translation is given in the applicant's co-pending application number GB 98 22075.9 entitled "PROGRAM CODE CONVERSION" the content of which is incorporated herein by reference to avoid wasteful duplication.

When performing dynamic binary translation the emulator appears to the subject code as if the subject code were running on the appropriate subject processor. The emulator replicates the subject machine including, for example, registers of the subject processor, such that the emulator provides a virtual subject machine. The emulated registers are termed herein "abstract registers" and correspond to the set of registers of the subject processor used by the subject code. In the preferred dynamic translation process the emulator first translates a predetermined small section of the subject code into an intermediate representation which represents the instructions of the subject code in a generic format, optionally performs optimisation on the intermediate representation, and then translates the optimised intermediate representation into executable binary code for the target processor. It is preferred that the small section of subject code corresponds to a "basic block" which starts with a first instruction at a unique entry point and ends at a last instruction at an unique exit point. Typically the last instruction of the block is a jump, call or branch instruction (conditional or unconditional).

In the field of binary translation, a problem arises with respect to the handling of exceptions. An exception indicates that a condition has occurred which needs to be handled before processing can continue. This includes explicit exceptions performed as an instruction in the subject code (for example an exception is reported if the value of one register is greater than the value of a second register), and implicit exceptions which occur for example as a result of memory read or write operations to a memory page that is not currently available. In both cases the exception is desirably reported to an exception handler written in subject code. However, many subject machine architecture definitions require that the exception is reported on a boundary between subject code instructions, following a predetermined set of rules. For example, the subject architecture definition may require that when the exception is reported, the effects of all previous subject instructions are complete, the exception points to the first instruction of the subject code which has not been executed and no effects from that subject instruction or any subsequent instruction have yet taken place. Further, the architecture definition of a particular processor may have different rules for different types of exceptions.

In the context of binary translation it is apparent that a target instruction performed on the target processor that causes an exception to be reported will not of itself fulfil the conditions for reporting the exception to an exception handler written in subject code. Instructions are almost always performed on the target processor in a different order compared with the order of instructions in the corresponding block of subject code, firstly due to the differences between the instruction set of the subject processor for which the subject code was written and the target processor on which the translated target code is run, and secondly because of the optimisation of the intermediate representation that typically occurs during translation.

Exceptions can occur in response to execution of the translated target code on the target processor, and can occur during execution of the emulator code on the target processor, i.e. during translation. In order to report an exception to the subject exception handler the state of the virtual subject processor represented by the emulator must be available to the subject exception handler, including the correct status of the registers of the subject processor.

One approach to this problem is to return the virtual subject machine to the conditions that applied at entry into the section of code being translated or executed, i.e. by returning the virtual subject machine to the condition prevailing at the point of entry into the current block of subject code instructions being translated or executed. The exception handler can now step through the instructions of the block of source code individually in sequence until the instruction causing the exception is identified.

U.S. Pat. No. 5,832,205 (Kelly et al) discloses an emulator which uses a set of "working" registers during emulation of each section of subject code. The content of each of these working registers is copied to a set of "official" virtual subject registers at the end of the section of subject code, using a gated store buffer. Therefore, if an exception occurs during emulation of a section of subject code this will affect only the working registers and the condition of the virtual subject machine can be recovered from the "official" registers at the point of entry into that section of subject code. However, the use of "working" and "official" registers adds significantly to the overhead of the emulation process in the target processor due to the copying of information from the "working" registers to the corresponding "official" registers at the end of each section of subject code.

SUMMARY

The following is a summary of various aspects and advantages realizable according to various embodiments of the invention. It is provided as an introduction to assist those skilled in the art to more rapidly assimilate the detailed discussion of illustrative embodiments which ensues and does not and is not intended in any way to limit the scope of the claims which are appended hereto in order to particularly point out the invention.

An aim of the present invention is to provide a method of representing subject registers in an emulator which allows exceptions to be accurately reported to a subject exception handler in accordance with the rules of the handler, whilst minimising overhead in the emulator. It is a further aim of the present invention to provide an emulation method and apparatus wherein subject registers are represented to allow accurate exception handling.

According to the present invention there is provided a method of representing a subject register in an emulator, the method comprising the steps of:

(a) mapping an abstract register representing a subject register of a subject machine to either a first location or to a second location within a target machine; and (b) alternating mapping of the abstract register between the first and second locations such that the content of one of the first or second locations represents a definitive version of the abstract register for use by the emulator during exception handling, whilst the other of the first or second locations represents a speculative version of the abstract register.

Preferably, for a predetermined section of subject code, one of the first or second locations holds a definitive value of the abstract register at entry into that section, whilst the other of the first or second locations holds a speculative current value of the abstract register for use during that section.

Preferably, the abstract register is mapped to the alternate one of the first or second locations upon reaching the end of the section of subject code. The speculative version becomes definitive when it is determined that no exception has occurred in the section of subject code. Ideally, the step of alternating mapping is performed only if the content of the speculative version of the abstract register has been updated during the predetermined section of subject code.

Preferably, the step (a) comprises the steps of: (a1) providing a plurality of abstract registers each representing a register of the subject machine; (a2) mapping each of the plurality of abstract registers to either a respective one of a first set of locations or a respective one of a second set of locations within the target machine. Preferably, the step (b) comprises alternating mapping for each of the abstract registers between the respective one of each of the first and second sets of locations.

Preferably, the first location and/or the second location is a memory location within the target machine. Alternatively, the first location and/or the second location is a register of the target machine.

Preferably, the method is for use with an emulator that performs dynamic binary translation. Suitably, the predetermined section of subject code represents one or more basic blocks of subject code.

Also according to the present invention there is provided a method for use in handling exceptions by an emulator performing program code conversion between subject code suitable for a subject processor and target code suitable for a target processor, the method comprising the steps of providing at least one abstract register (X,Y) each representing a register of the subject processor; (b) mapping the or each abstract register to a corresponding pair of locations within the target processor; and (c) alternating mapping of the or each abstract register between a first of the pair of locations and a second of the pair of locations, such that for a predetermined section of subject code, one of the first or second locations holds a definitive value of the abstract register at entry into that section for use by the emulator during exception handling, whilst the other of the first or second locations holds a speculative current value of the abstract register for updating by the emulator during that section.

According to further aspects of the present invention there is provided an emulator method and an emulator apparatus for performing the method according to any statement herein. The present invention also extends to a computer when programmed to perform the method according to any statement herein, to a computer program for performing the method according to any statement herein, and to a computer program product containing computer readable instructions for performing the method according to any statement herein.

BRIEF DESCRIPTION OF THE DRAWINGS

For a better understanding of the invention, and to show how embodiments of the same may be carried into effect, reference will now be made, by way of example, to the accompanying diagrammatic drawings, in which:

FIGS. 5 and 6 show example sets of abstract registers.

DETAILED DESCRIPTION OF ILLUSTRATIVE EMBODIMENTS

Figure 1:
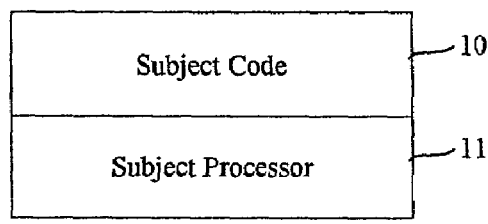
FIG. 1 shows a typical prior art configuration for a subject processor.

Referring to FIG. 1 a typical prior art arrangement is shown illustrating the configuration of a subject machine wherein subject code 10 is executed directly on a subject processor 11. Suitably the subject code is executable binary code. However, the subject code may be represented in any suitable language with intermediate layers (compilers, etc.) between the subject code 10 and the subject processor 11 as will be familiar to the skilled person.

Figure 2:
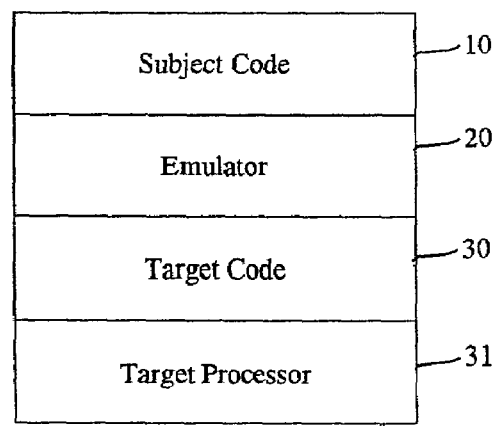
FIG. 2 shows a typical emulator using binary translation.

Referring now to FIG. 2, a typical prior art configuration is shown to illustrate the use of a binary translation type emulator 20 as an intermediate layer enabling the subject code 10 to be executed by a target processor 31. The preferred embodiment of the present invention is particularly intended for use with an emulator 20 which performs dynamic binary translation of the subject code 10 into target code 30 executable on the target processor 31.

Figure 3:
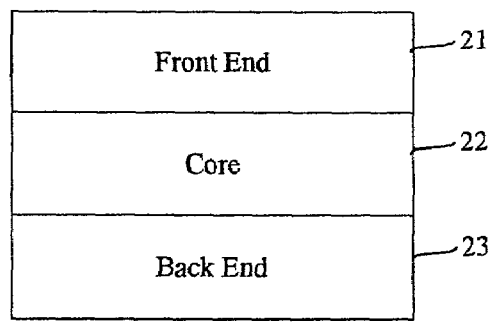
FIG. 3 shows a configuration of an emulator using binary translation as may be employed in preferred embodiments of the present invention.

Referring now to FIG. 3 the emulator 20 of the preferred embodiment is illustrated in more detail and comprises a front end 21, a core 22 and a back end 23.

The front end 21 is configured specific to the subject processor 11 being emulated. The front end 21 translates instructions of the subject code 10 into a generic intermediate representation for each basic block of subject code. Each basic block suitably includes a sequential set of instructions between a first instruction representing a unique entry point and a last instruction at a unique exit point (such as a jump, call or branch instruction). In a particularly preferred embodiment the emulator 20 selects a group block comprising two or more basic blocks chosen for code generation and optimisation as a single unit. Further, the emulator 20 supports iso-blocks representing the same basic block of subject code under different entry conditions. Each predetermined section of the subject code 10 results in a block of intermediate representation (an "IR block").

The core 22 optimises each IR block generated by the front end 21 by employing optimisation techniques which need not be described here in detail. The back end 23 takes optimised IR blocks from the core 22 and produces target code 30 executable by the target processor 31.

Figure 4:
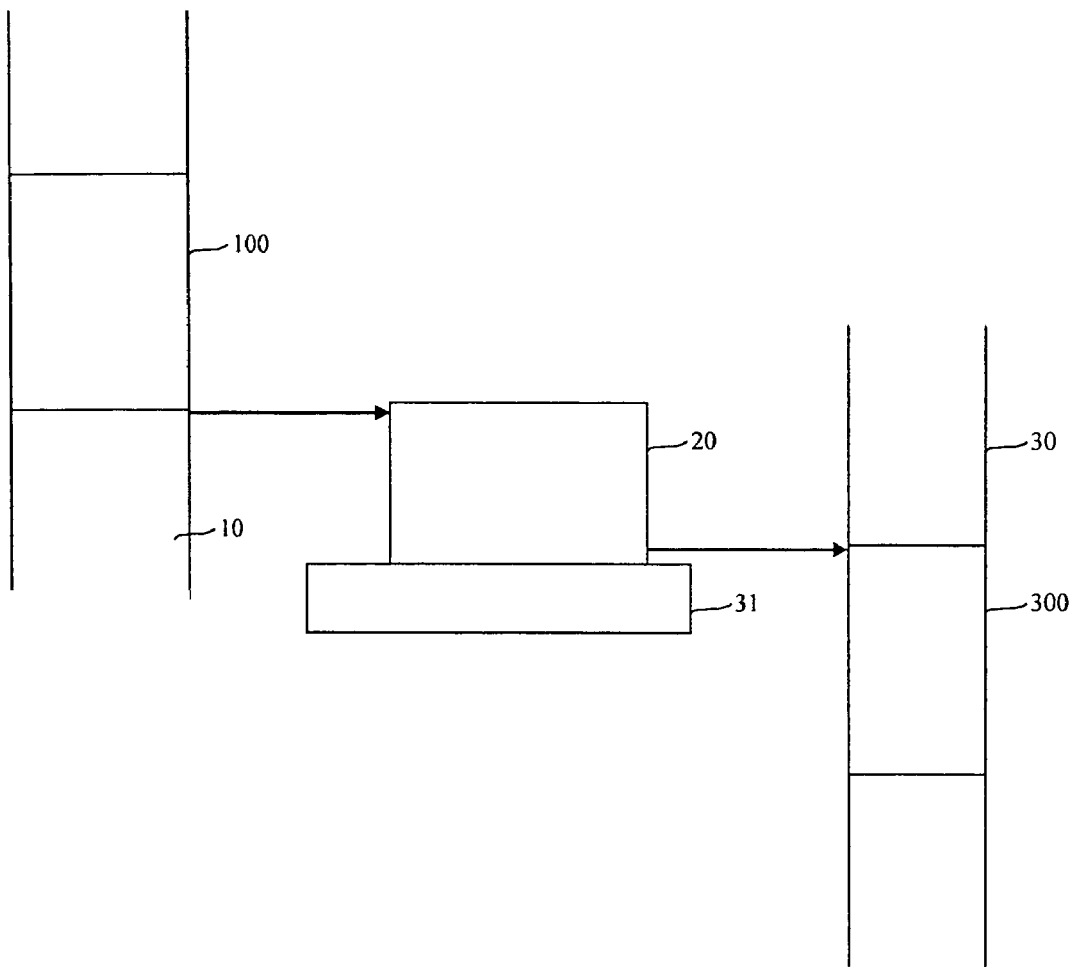
FIG. 4 shows a preferred binary translation type emulator in use.

As shown in FIG. 4, in use a first predetermined section of the subject code 10 is identified such as a basic block 100 and translated by the emulator 20 running on the target processor 31 in a translation mode. The target processor 31 then executes the corresponding optimised and translated block 300 of target code 30.

The preferred emulator 20 includes a plurality of abstract registers, suitably provided in the core 22 shown in FIG. 3, which represent the physical registers that are used within the subject processor 11 to execute the subject code 10. The abstract registers define the state of the subject processor 11 being emulated by representing the expected effects of the subject code instructions on the registers of the subject processor.

As shown in FIG. 5, in the preferred embodiment two sets of abstract registers are provided, here labelled set A and set B. At initialisation a first of these two sets, for example set A, holds "definitive" values. That is, the registers of set A are defined to hold initial values which are known to be valid representing the expected content of the physical registers of the subject processor 11 being emulated.

The second set of abstract registers, in this example labelled set B, are initially defined to represent "speculative" values. That is, at initialisation the second set of abstract registers (set B) also hold the expected initial content of the physical registers of the subject processor 11, but the values in set B are not relied upon as being valid.

In the translation process the emulator 20 uses the speculative set of abstract registers (i.e., set B) such that the content is updated to show the expected state of the physical registers of the subject processor 11 after execution of the block 100 of subject code 10. During translation of the first block, the content of the definitive set of abstract registers of (i.e., set A) remains unchanged.

If an exception occurs during translation or execution of the basic block 100, then the emulator 20 readily recovers the condition of the subject registers upon entry into the block 100 using the abstract registers marked as holding definitive data (i.e., set A). The exception handler can now step through the instructions of the block 100 of the source code 10 in sequence until the instruction causing the exception is identified. Here, the status of the abstract registers is updated after each instruction. Therefore, when the subject code instruction responsible for the exception is identified the condition of the virtual subject machine represented by the emulator are reported to the subject code exception handler according to the rules thereof. The subject code exception handler recovers the exception in accordance with the handling process and returns to a point in the subject code appropriate to the exception. For example, it is common that the exception handler returns the emulator to the next unexecuted instruction of the source code 10. The translation or execution process can then continue from that point.

After the successful execution of the translated block of target code 300 the registers in the set holding speculative values (i.e., set B) will have been updated to hold the expected content of the equivalent registers of the subject processor 11 being emulated at the end of the basic block 100 of subject code 10. At this point, the abstract registers of the first set (i.e., set A) hold the condition of the subject processor at entry to the block of subject code 100, and the abstract registers of the second set (i.e., set B) hold the condition at the end of the block 100. Since the block 100 has been successfully translated and executed, the abstract registers of set B are now defined as holding definitive values, and the abstract registers of set A are defined as holding speculative values.

The abstract registers of set A and set B suitably form register pairs. Each register in set A has a corresponding partner register in set B. One of the pair holds the definitive value of that abstract register, whilst the other holds the speculative value. At the end of each section of code the definition of these two registers is reversed such that each register of the pair performs the opposite function during the next section of code. Alternating the function of the two registers of each register pair provides a simple and elegant method of maintaining the entry conditions for the current section of code.

As a further advantage, it is not necessary to update the status of every abstract register upon successful completion of each section of code. Only those registers which have been changed during that section need be updated to show their new function. If the value of a particular abstract register is not changed during a section of code then that value will remain in place during the next section to perform the same definitive or speculative function as appropriate.

Referring now to FIGS. 5 and 6, a simplified example embodiment will now be described. At step 1 shown in FIG. 5, a first abstract register (Reg $X_A$) representing register X of the subject processor 11 contains the definitive value whilst a second abstract register (Reg $X_B$) contains the speculative value. The abstract registers are suitably held in memory locations and a working map for register X points to the location of the speculative version Reg $X_B$. Similarly, for register Y in this example initially Reg $Y_A$ is definitive whilst Reg $Y_B$ is speculative. After performance of one or more instructions, such as the block 100 of the subject code 10, the mapping for the abstract registers is updated for step 2 as shown in FIG. 6. In this example, the content of the speculative register Y has changed and therefore Reg $Y_B$ is now taken to be the definitive version for use in a subsequent block. The map for register Y is updated to point to Reg $Y_A$ as the speculative version. By contrast, register X was not affected by the instruction or instructions in the block 100 and therefore Reg $X_A$ remains as the definitive version whilst Reg $X_B$ remains as the speculative version.

To allow continuity of register content between sections of code, suitably the first read operation encountered during a current section of code uses the definitive version of each particular abstract register. The definitive version represents the condition of that register at entry into the current section of code and therefore maintains continuity with the previous section. Further read operations also use the definitive version of each abstract register, until a write operation is encountered. The first write operation uses the speculative version of each particular abstract register. Therefore the definitive version remains unchanged and the speculative version now contains the current value of the relevant abstract register. Subsequent read and write operations use the speculative version for the remainder of that section of code.

As described above, in preferred embodiments of the present invention an abstract register are provided corresponding to each physical register of the subject processor 11, with the abstract register being mapped to two predetermined locations. One of each pair of abstract register locations contains a definitive value whilst the other contains a speculative value. The function of these two locations is readily reversed to alternate the location holding definitive content. Therefore, time consuming copying operations are avoided.

In the preferred embodiment, two versions of each of abstract register are achieved by mapping to two sets of memory locations and the definitive and speculative versions alternated by alternating the memory mapping between these two locations. Updating the map of the abstract registers held in the target machine to replicate the physical registers of the subject processor is performed quickly and simply at translation time, and imposes no overhead when the translated code is executed, possibly many times.

In a further preferred embodiment, one or both of the definitive and speculative versions of the abstract registers may be stored in a pair of target machine registers (on a target machine with a sufficiency thereof) as an alternative to using a pair of memory locations.

One aspect of the preferred embodiment of the present invention addresses the problem of fixing register references across branches, and in particular a branch (or loop) from a current block of subject code to a previously translated block. Branches between blocks of code are commonly encountered in practice, and often involve the same block of code being referenced from more than one other locations within the subject code, thereby generating different entry conditions. One solution is to copy the content from the definitive to the speculative version of the abstract register, such that the entry conditions are appropriate for use of the previously translated block of code. For example, when the block was first translated the first version Reg $X_A$ was definitive. Hence, if the same block of translated code is to be used again subsequently, and it is reached in a condition where the second version of the abstract register Reg $X_B$ is definitive, then the content of register $X_B$ must be copied to register Reg $X_A$ before continuing. This incurs a copying overhead when implementing a branch to a previously translated block of code. A preferred solution employed in embodiments of the present invention avoids this copying operation by translating the block again, this time under the conditions prevailing at the time of the branch, such that plural versions of the previously translated code now exist each associated with a particular set of entry conditions. Although increased translation work is involved, copying overhead during execution is avoided. In general, translating a section of subject code (containing any number of basic blocks) by one extra time eliminates the compensation copying that would have been necessary for any particular register that was updated an odd number of times in that loop.

Although the embodiments described above refer to an emulator employing dynamic binary translation, the method is also applicable to static translation where a large section of code is translated prior to execution. In static translation the section of code selected for translation typically represents a whole program or a major part of a program. However, it is still convenient to use the method described above for handling exceptions arising during translation and execution of the translated code, enabling exception handling to be performed at least from the condition at entry into that section of code. Further, the method is applicable to program code optimisation wherein the subject machine and the target machine have the same or at least compatible instruction sets and architectures.

The present invention extends to a computer when programmed to perform the method described above, to a computer program for performing the method described above, and to a computer program product containing computer readable instructions for performing the method described above.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of representing a subject register in an emulator, the method comprising the steps of:
   (a) mapping an abstract register representing a subject register of a subject machine to either a first location or to a second location within a target machine; and
   (b) alternating mapping of the abstract register between the first and second locations such that one of the first or second locations represents a definitive version of the abstract register for use by the emulator during exception handling, whilst the other of the first or second locations represents a speculative version of the abstract register.

2. A method as claimed in claim 1, wherein for a predetermined section of subject code, one of the first or second locations holds a definitive value of the abstract register at entry into that section, whilst the other of the first or second locations holds a speculative current value of the abstract register for use during that section.

3. A method as claimed in claim 2, wherein the step of alternating mapping is performed upon reaching the end of the predetermined section of subject code.

4. A method as claimed in claim 3, wherein the step of alternating mapping is performed only if the content of the speculative version of the abstract register has been updated during the predetermined section of subject code.

5. A method as claimed in claim 2, wherein the predetermined section of subject code represents one or more basic blocks of subject code.

6. A method as claimed in claim 2, wherein the method is for use in an emulator that performs dynamic binary translation.

7. A method as claimed in claim 1, further comprising:
providing a plurality of abstract registers each representing a register of the subject machine; and
mapping each of the plurality of abstract registers to either a respective one of a first set of locations or a respective one of a second set of locations within the target machine; and
alternating mapping for each of the abstract registers between the respective one of each of the first and second sets of locations.

8. A method as claimed in claim 1, wherein the first location and the second location are each a memory location or a target register.

9. A method for use in handling exceptions by an emulator performing program code conversion between subject code suitable for a subject processor and target code suitable for a target processor, the method comprising the steps of:
(a) providing at least one abstract register each representing a register of the subject processor;
(b) mapping the or each abstract register to a corresponding pair of locations within the target processor; and
(c) alternating mapping of the or each abstract register between a first of the pair of locations and a second of the pair of locations, such that for a predetermined section of subject code, one of the first or second locations holds a definitive value of the abstract register at entry into that section for use by the emulator during exception handling, whilst the other of the first or second locations holds a speculative current value of the abstract register for updating by the emulator during that section.

10. A method as claimed in claim 9, wherein the step of alternating mapping is performed upon reaching the end of the predetermined section of subject code.

11. A method as claimed in claim 10, wherein the step of alternating mapping is performed only for the or each abstract register that has been updated during the predetermined section of subject code.

12. An emulator apparatus, comprising:
an emulator for mapping an abstract register representing a subject register of a subject machine to either a first location or to a second location within a target machine, the emulator for alternating mapping of the abstract register between the first and second locations such that the content of one of the first or second locations represents a definitive version of the abstract register for use by the emulator during exception handling, whilst the other of the first or second locations represents a speculative version of the abstract register.

13. An emulator apparatus for performing program code conversion between subject code suitable for a subject processor and target codes suitable for a target processor, the emulator apparatus comprising:
at least one abstract register each representing a register of the subject processor; and
an emulator for mapping the or each abstract register to a corresponding pair of locations within the target processor, and for alternating mapping of the or each abstract register between a first of the pair of locations and a second of the pair of locations, such that for a predetermined section of subject code, one of the first or second locations holds a definitive value of the abstract register at entry into that section for use by the emulator during exception handling, whilst the other of the first or second locations holds a speculative current value of the abstract register for updating by the emulator during that section.

14. A computer program product containing computer readable instructions for performing a method of representing a subject register in an emulator, the method comprising the steps of:
(a) mapping an abstract register representing a subject register of a subject machine to either a first location or to a second location within a target machine; and
(b) alternating mapping of the abstract register between the first and second locations such that one of the first or second locations represents a definitive version of the abstract register for use by the emulator during exception handling, whilst the other of the first or second locations represents a speculative version of the abstract register.

15. A computer program product containing computer readable instructions for performing program code conversion between subject code suitable for a subject processor and target codes suitable for a target processor, the method comprising the steps of:
(a) providing at least one abstract register each representing a register of the subject processor;
(b) mapping the or each abstract register to a corresponding pair of locations within the target processor; and
(c) alternating mapping of the or each abstract register between a first of the pair of locations and a second of the pair of locations, such that for a predetermined section of subject code, one of the first or second locations holds a definitive value of the abstract register at entry into that section for use by the emulator during exception handling, whilst the other of the first or second locations holds a speculative current value of the abstract register for updating by the emulator during that section.

* * * * *